United States Patent
Wu

(10) Patent No.: US 10,313,924 B2
(45) Date of Patent: Jun. 4, 2019

(54) DEVICE AND METHOD OF AGGREGATING WLAN AND LTE SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 123 days.

(21) Appl. No.: 15/152,579

(22) Filed: May 12, 2016

(65) Prior Publication Data

US 2016/0337900 A1 Nov. 17, 2016

Related U.S. Application Data

(60) Provisional application No. 62/160,578, filed on May 12, 2015.

(51) Int. Cl.
| | |
|---|---|
| *H04L 5/00* | (2006.01) |
| *H04W 28/06* | (2009.01) |
| *H04L 29/08* | (2006.01) |
| *H04L 12/741* | (2013.01) |
| *H04W 84/12* | (2009.01) |
| *H04W 88/08* | (2009.01) |

(52) U.S. Cl.
CPC ............ *H04W 28/06* (2013.01); *H04L 5/001* (2013.01); *H04L 45/74* (2013.01); *H04L 69/321* (2013.01); *H04L 69/323* (2013.01); *H04L 5/0053* (2013.01); *H04W 84/12* (2013.01); *H04W 88/08* (2013.01)

(58) Field of Classification Search
CPC ..... H04W 28/06; H04W 88/08; H04W 84/12; H04L 5/001; H04L 45/74; H04L 69/323; H04L 69/321; H04L 5/0053
See application file for complete search history.

(56) References Cited

U.S. PATENT DOCUMENTS

| | | | | |
|---|---|---|---|---|
| 7,924,761 | B1* | 4/2011 | Stevens | H03M 13/3761 370/315 |
| 8,249,031 | B1* | 8/2012 | Hirsch | H04W 72/1215 370/336 |
| 2013/0088983 | A1* | 4/2013 | Pragada | H04W 16/14 370/252 |
| 2013/0242843 | A1* | 9/2013 | Kojima | H04W 4/06 370/312 |
| 2014/0119353 | A1* | 5/2014 | McCann | H04L 69/161 370/338 |
| 2014/0321376 | A1* | 10/2014 | Damnjanovic | H04W 72/1215 370/329 |

(Continued)

OTHER PUBLICATIONS

Search Report dated Sep. 23, 2016 for EP application No. 16169325.4, pp. 1-8.

(Continued)

*Primary Examiner* — Curtis A Alia

(74) *Attorney, Agent, or Firm* — Winston Hsu

(57) ABSTRACT

A communication device for aggregating a long term evolution (LTE) system and a wireless local area network (WLAN) comprises a storage unit for storing instructions and a processing means coupled to the storage unit. The processing means is configured to execute the instructions stored in the storage unit. The instructions comprise generating a LTE protocol data unit (PDU); generating a WLAN PDU comprising the LTE PDU; and transmitting the WLAN PDU to an access point via a WLAN physical layer.

10 Claims, 4 Drawing Sheets

(56) References Cited

U.S. PATENT DOCUMENTS

| | | | | |
|---|---|---|---|---|
| 2015/0305041 | A1* | 10/2015 | Kim | H04W 72/085 |
| | | | | 370/329 |
| 2016/0337900 | A1* | 11/2016 | Wu | H04L 5/001 |
| 2016/0338068 | A1* | 11/2016 | Cheng | H04W 28/08 |
| 2016/0338074 | A1* | 11/2016 | Chou | H04W 76/046 |
| 2016/0338102 | A1* | 11/2016 | Nuggehalli | H04L 12/4645 |
| 2016/0366612 | A1* | 12/2016 | Wu | H04W 28/06 |
| 2016/0366720 | A1* | 12/2016 | Wu | H04W 76/027 |
| 2017/0135151 | A1* | 5/2017 | Fujishiro | H04W 76/064 |

OTHER PUBLICATIONS

Fujitsu, "Requirement for layer 2 structure in LTE-WLAN aggregation", 3GPP TSG-RAN WG2 Meeting #89b, R2-151435, Apr. 20-24, 2015, Bratislava, Slovakia, XP050936363, pp. 1-3.

Intel Corporation, Qualcomm Incorporated, KT Corp, CMCC, KDDI, "User Plane Architecture Aspects of LTE/WLAN aggregation", 3GPP TSG-RAN2 Meeting #89bis, R2-151193, Apr. 20-24, 2015, Bratislava, Slovakia, XP050936162, pp. 1-5.

Samsung, "User Plane Architecture for LTE-WLAN integration", 3GPP TSG-RAN2 Meeting #89bis, R2-151668, Apr. 20-24, 2015, Bratislava, Slovakia, XP050936573, pp. 1-4.

MediaTek Inc., "UP architecture and required functions for LTE/WLA aggregation", 3GPP TSG-RAN2 #89bis Meeting, R2-151358, Apr. 20-24, 2015, Bratislava, Slovakia, XP050936306, pp. 1-4.

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).

3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.323 V12.3.0 (Mar. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).

IEEE P802.11-REVmc/D3.3, Oct. 2014, Draft Standard for Information technology—Telecommunications and information exchange between systems—Local and metropolitan area networks—Specific requirements, Part 11: Wireless LAN Medium Access Control(MAC) and Physical Layer (PHY) Specifications, Copyright © 2014 IEEE, New York, USA.

\* cited by examiner

US 10,313,924 B2

DEVICE AND METHOD OF AGGREGATING WLAN AND LTE SYSTEM

CROSS REFERENCE TO RELATED APPLICATIONS

This application claims the benefit of U.S. Provisional Application No. 62/160,578, filed on May 12, 2015, which is incorporated herein by reference.

BACKGROUND OF THE INVENTION

1. Field of the Invention

The present invention relates to a device and a method used in a wireless communication system, and more particularly, to a device and a method of aggregating a wireless local area network (WLAN) and a long term evolution (LTE) system.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system extends cell coverage of an eNB, increases peak data rate and throughput, and includes advanced techniques, such as carrier aggregation (CA), licensed-assisted access (LAA) using LTE, etc.

The LTE system may be aggregated with a wireless local area network (WLAN) to improve throughput of the LTE system. However, detailed realization for aggregating the WLAN and LTE system is still unknown.

Thus, how to aggregating the WLAN and the LTE system is an important problem to be solved.

SUMMARY OF THE INVENTION

The present invention therefore provides a communication device and method for aggregating a WLAN and a LTE system to solve the abovementioned problem.

A communication device for aggregating a long term evolution (LTE) system and a wireless local area network (WLAN) comprises a storage unit for storing instructions and a processing means coupled to the storage unit. The processing means is configured to execute the instructions stored in the storage unit. The instructions comprise generating a LTE protocol data unit (PDU); generating a WLAN PDU comprising the LTE PDU; and transmitting the WLAN PDU to an access point via a WLAN physical layer.

A communication device for aggregating a long term evolution (LTE) system and a wireless local area network (WLAN) comprises a storage unit for storing instructions and a processing means coupled to the storage unit. The processing means is configured to execute the instructions stored in the storage unit. The instructions comprise generating a LTE protocol data unit (PDU), wherein a size of the LTE PDU is not larger than a maximum size of a WLAN media access control (MAC) service data unit (SDU); and transmitting the LTE PDU to an access point, for the access point to generate a WLAN MAC PDU comprising the LTE PDU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
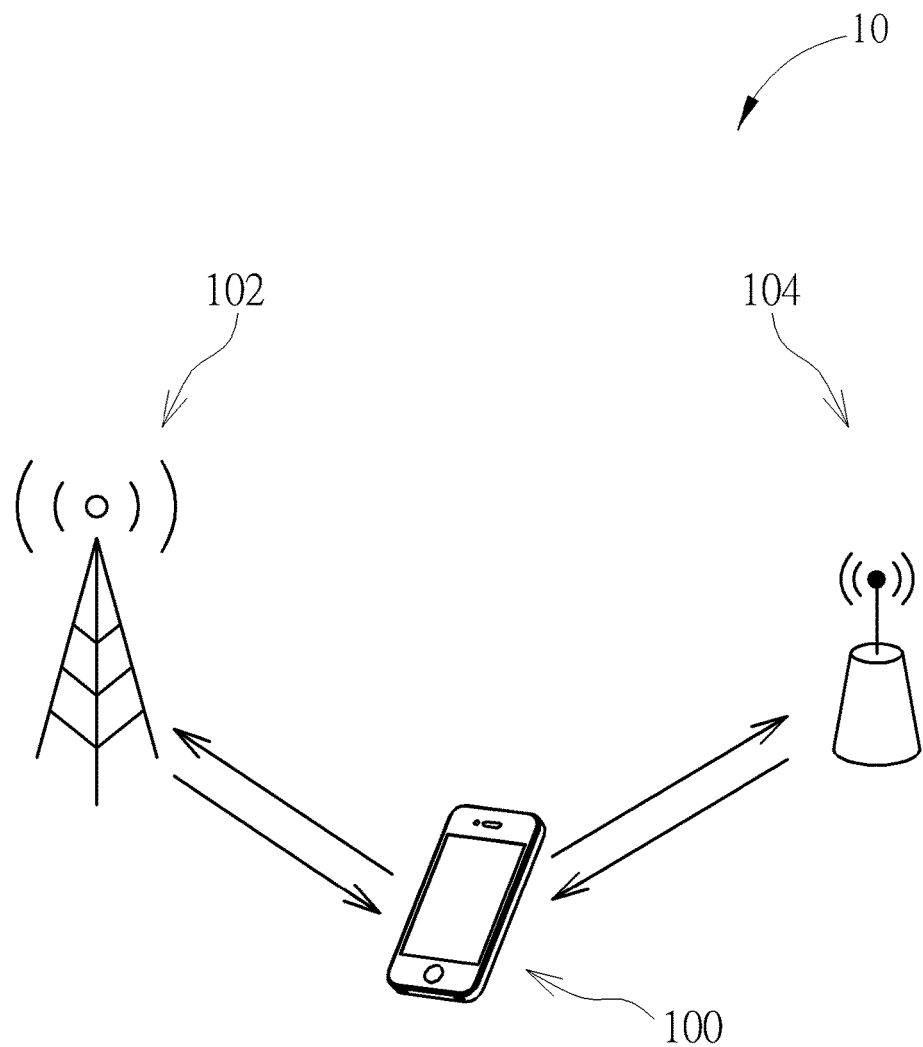
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100, a base stations (BS) 102 and an access point (AP) 104. In FIG. 1, the UE 100, the BS 102 and the AP 104 and are simply utilized for illustrating the structure of the wireless communication system 10. Practically, the BS 102 may be an evolved Node-B (eNB) and/or a relay station in an evolved universal terrestrial radio access network (E-UTRAN), a long term evolution (LTE) system, a LTE-Advanced (LTE-A) system, an evolution of the LTE-A system, or a fifth generation (5G) system employing orthogonal frequency-division multiplexing (OFDM) and/or non-OFDM and a transmission time interval (TTI) shorter than 1 millisecond (e.g., 100 or 200 microseconds). The AP 104 may be operated according to Institute of Electrical and Electronics Engineers (IEEE) 802.11 standard(s), such as IEEE 802.11a, IEEE 802.11n, IEEE 802.11ac and/or IEEE 802.11ax. Note that the BS 102 may also support the IEEE standard(s).

As shown in FIG. 1, the UE 100 may be configured to communicate with the BS 102 and/or the AP 104. That is, the UE 100 may perform a transmission/reception via the BS 102 and/or the AP 104. For example, the UE 100 may transmit and/or receive packets (e.g., protocol data units (PDUs)) to and/or from the BS 102. Similarly, the UE 100 may transmit and/or receive packets (e.g., PDUs) to and/or from the AP 104.

The UE 100 may be a mobile phone, a laptop, a tablet computer, an electronic book, a portable computer system, a vehicle, or an aircraft. For uplink, the UE 100 is the transmitter and the BS 102 and/or the AP 104 is the receiver, and for downlink, the BS 102 and/or the AP 104 is the transmitter and the UE 100 is the receiver.

Figure 2:
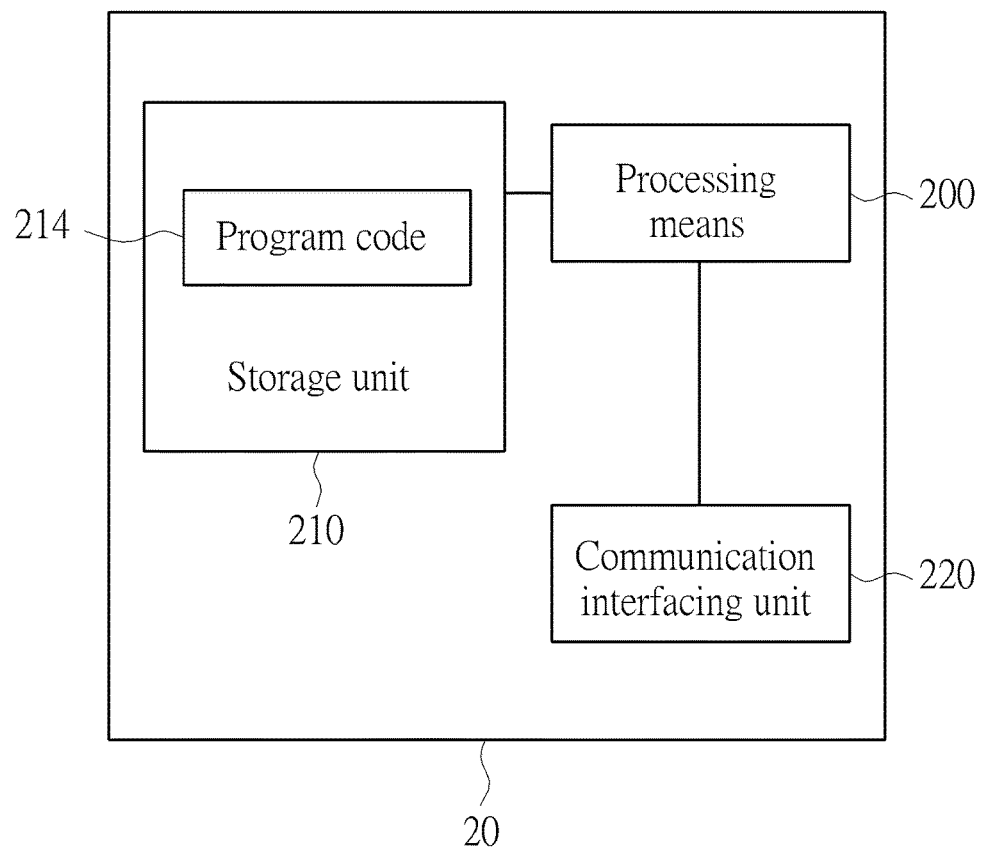
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the AP 104 shown in FIG. 1, but is not limited herein. The communication device 20 includes a processing means 200 such as a microprocessor or Application Specific Integrated Circuit, a storage unit 210 and a communication interfacing unit 220. The storage unit 210 may be any data storage device that stores a program code 214, accessed and executed by the processing means 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing means 200.

Figure 3:
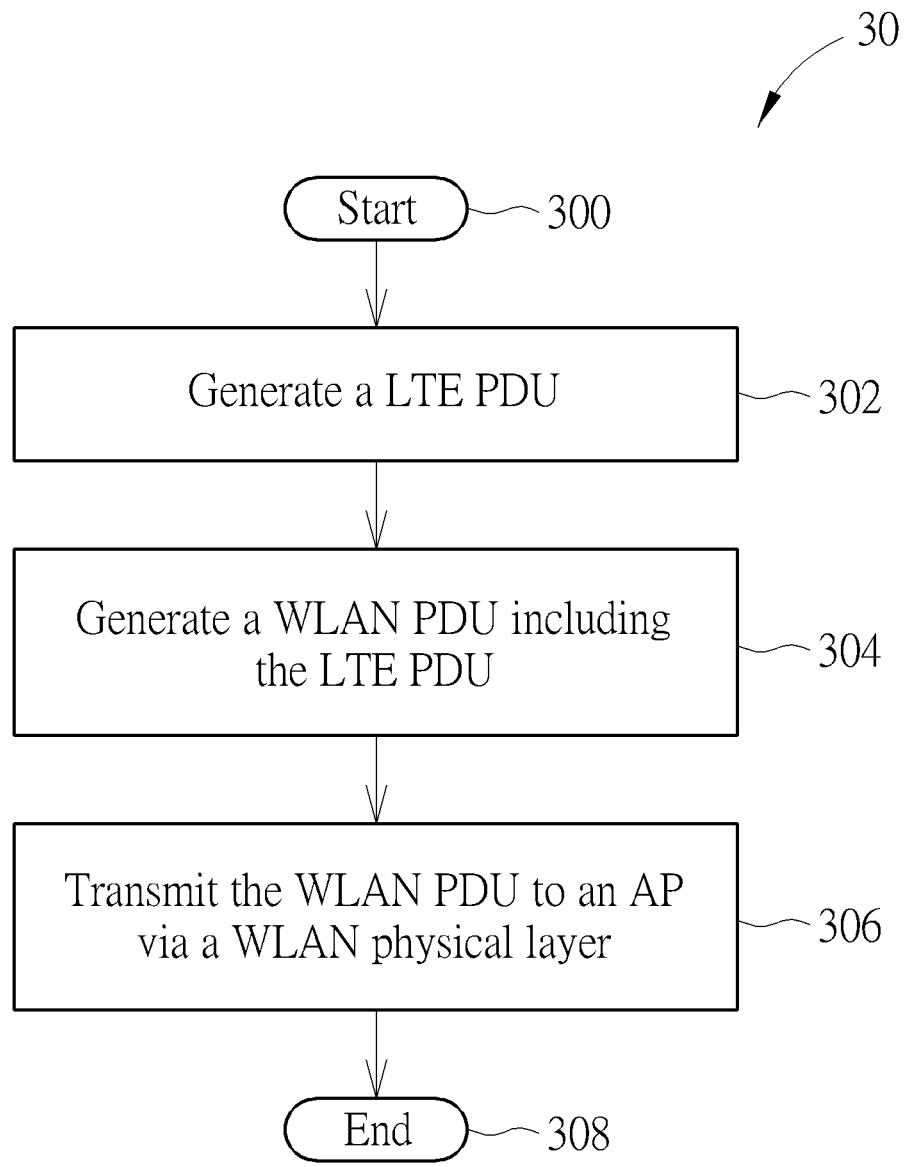
FIG. 3 is a flowchart of a process according to an example of the present invention.

FIG. 3 is a flowchart of a process 30 according to an example of the present invention. The process 30 may be utilized in a communication device, for aggregating a LTE system and a wireless local area network (WLAN). The process 30 may be compiled into the program code 214 and includes the following steps:

Step 300: Start.
Step 302: Generate a LTE PDU.
Step 304: Generate a WLAN PDU including the LTE PDU.
Step 306: Transmit the WLAN PDU to an AP via a WLAN physical layer.
Step 308: End.

According to the process 30, the communication device (e.g., the UE 100 or the BS 102) may generate a LTE PDU, and may generate a WLAN PDU (e.g., WiFi PDU) including the LTE PDU. Then, the communication device may transmit the WLAN PDU to an AP (e.g., the AP 104) via a WLAN physical layer. That is, the LTE PDU may be generated such that a size of the LTE PDU is not larger than a maximum size of a payload in the WLAN PDU. Thus, the LTE PDU may be included in the WLAN PDU for being transmitted via the WLAN physical layer. As a result, a problem that a LTE PDU cannot be transmitted via the WLAN physical layer due to that a size of the LTE PDU is larger than a maximum size of a payload in the WLAN PDU is solved, and the LTE system is aggregated with the WLAN properly.

If the communication device transmits a plurality of LTE PDUs via the WLAN physical layer, each of the plurality of LTE PDUs has a size not larger than the maximum size of the payload in the WLAN PDU.

In one example, the WLAN PDU may be a WLAN media access control (MAC) PDU, and the payload of the WLAN MAC PDU may be a WLAN MAC service data unit (SDU). A size of the LTE PDU may not be larger than a maximum size of a WLAN MAC SDU. For example, the maximum size of the WLAN MAC SDU may be 2304 bytes (or octets), and the size of the LTE PDU is less than 2305 bytes (or octets).

If a WLAN logical link control (LLC) protocol is used, the maximum size of the payload in the WLAN MAC PDU should be (the maximum size of the WLAN MAC SDU—a size of a LLC protocol header). That is, the size of the LTE PDU is not larger than (the maximum size of the WLAN MAC SDU—the size of the LLC PDU header). If a WLAN logical Subnetwork Access Protocol (SNAP) is used, the maximum size of the payload in the WLAN MAC PDU should be (the maximum size of the WLAN MAC SDU—a size of a SNAP header). That is, the size of the LTE PDU is not larger than (the maximum size of the WLAN MAC SDU—the size of the SNAP header). If both the WLAN LLC protocol and the SNAP are used, the maximum size of the payload in the WLAN MAC PDU should be (the maximum size of the WLAN MAC SDU—the size of the LLC protocol header—the size of the SNAP header). That is, the size of the LTE PDU is not larger than (the maximum size of the WLAN MAC SDU—the size of the LLC protocol header—the size of the SNAP header).

The above examples are illustrated based on that the communication device generates the WLAN PDU by itself. In another example, the communication device may simply provide the LTE PDU to another communication device, for the other communication device to generate the WLAN PDU. In one example, another communication device may indicate to the communication device the maximum size of the payload in the WLAN PDU. In another example, the communication device is preconfigured with the maximum size of the payload in the WLAN PDU.

In one example, the communication device may generate another LTE PDU which has a size larger than the maximum size of the payload in the WLAN PDU, and may transmit the other LTE PDU via a LTE physical layer.

Figure 4:
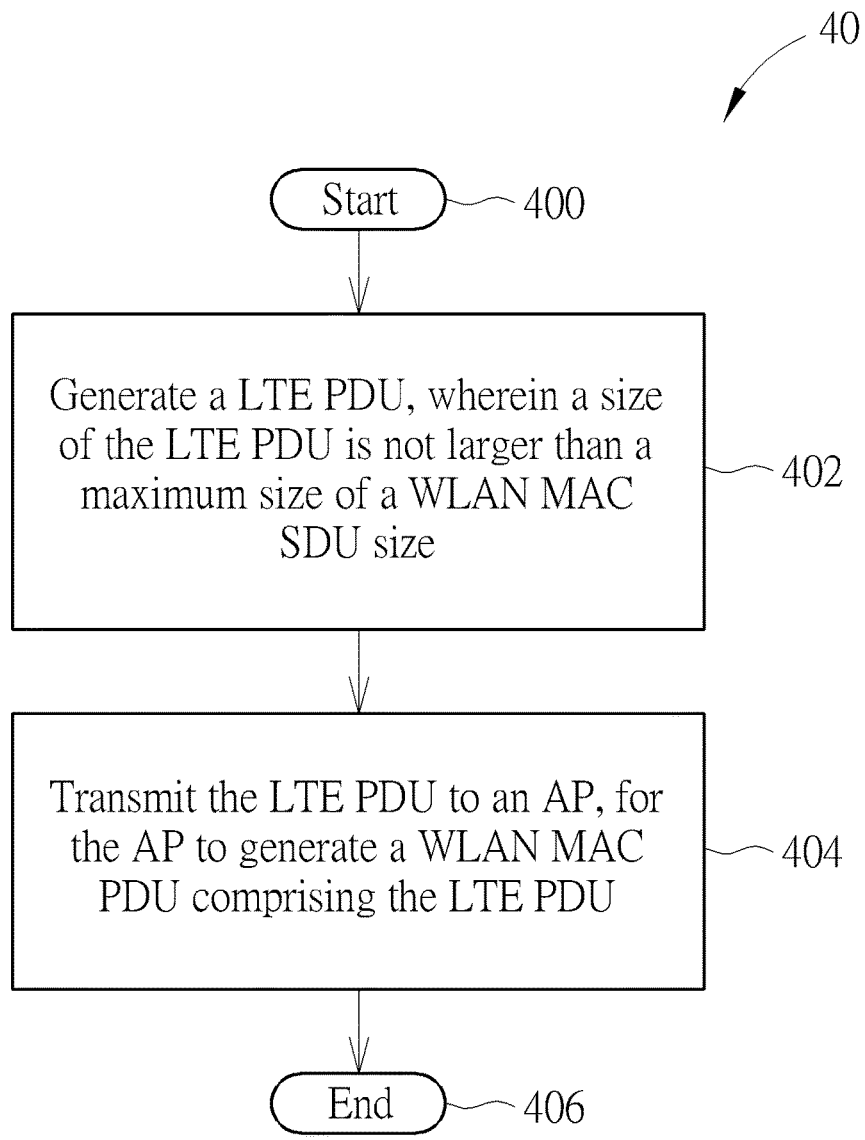
FIG. 4 is a flowchart of a process according to an example of the present invention.

FIG. 4 is a flowchart of a process 40 according to an example of the present invention. The process 40 may be utilized in a communication device, for aggregating a LTE system and a WLAN. The process 40 may be compiled into the program code 214 and includes the following steps:

Step 400: Start.
Step 402: Generate a LTE PDU, wherein a size of the LTE PDU is not larger than a maximum size of a WLAN MAC SDU size.
Step 404: Transmit the LTE PDU to an AP, for the AP to generate a WLAN MAC PDU comprising the LTE PDU.
Step 406: End.

According to the process 40, the communication device (e.g., the UE 100 or the BS 102) generates a LTE PDU, wherein a size of the LTE PDU is not larger than a maximum size of a WLAN MAC SDU. For example, the maximum size of the WLAN MAC SDU may be 2304 bytes (or octets), and the size of the LTE PDU is less than 2305 bytes (or octets). Then, the communication device may transmit the LTE PDU to an AP (e.g., the AP 104), for the AP to generate a WLAN MAC PDU comprising the LTE PDU. Thus, the LTE PDU may be included in the WLAN MAC PDU for being transmitted via the WLAN physical layer. As a result, the problem that the LTE PDU cannot be transmitted via the WLAN physical layer is solved, and the LTE system is aggregated with the WLAN properly.

There are various realizations for implementing the processes 30 and 40, which are illustrated as follows.

In one example, the LTE PDU and the other LTE PDU (stated in the paragraph before the process 40) may comprise or include a LTE packet data convergence protocol (PDCP) PDU. In one example, the LTE PDU may be a LTE-WLAN Aggregation Adaption Protocol PDU while the other LTE PDU may be a LTE PDCP PDU. In another example, the LTE PDU may be a LTE radio link control (RLC) PDU. In one example, the WLAN MAC PDU, the WLAN MAC SDU and the WLAN physical layer may conform to at least one IEEE 802.11 standard, e.g., IEEE 802.11a, IEEE 802.11n, IEEE 802.11ac and/or IEEE 802.11ax. In one example, the WLAN PDU may include an SNAP header which may include an Ethernet type for the LTE PDU. In one example, the WLAN MAC PDU may include a LLC header. In one example, the LTE PDU may not include any control element.

It should be noted that a maximum size of a LTE PDCP SDU may be 8188 bytes. A WLAN transmission unit of a communication device (e.g., the UE 100 or the BS 102) may not be able to handle this maximum size, and a WLAN transmission failure occurs. The above examples provide architectures that the communication device may transmit a LTE PDCP PDU (or a LTE RLC PDU) which can be included in a WLAN PDU. A format of the LTE PDCP PDU (or the LTE RLC PDU) may be an existent format, or may be a new format defined for being included in the WLAN PDU. The WLAN PDU mentioned above may or may not be an aggregated MAC Protocol Data Unit (MPDU) defined for IEEE 802.11n or IEEE 802.11ac. The WLAN SDU mentioned above may or may not be an aggregated MAC service data unit (MSDU) defined for IEEE 802.11n or IEEE 802.11ac.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a communication device and method for aggregating a LTE system and a WLAN. According to the present invention, LTE PDU(s) is generated according to a size of a WLAN PDU such that the LTE PDU(s) can be included in the WLAN PDU. As a result, the problem that the LTE PDU(s) cannot be transmitted via a WLAN physical layer is solved, and the LTE system is aggregated with the WLAN properly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for aggregating a long term evolution (LTE) system and a wireless local area network (WLAN), the communication device comprising:
   a storage device; and
   a processing circuit, coupled to the storage device, wherein the storage device stores, and the processing circuit is configured to execute instructions of:
   generating a LTE protocol data unit (PDU), wherein a size of the LTE PDU is not larger than a maximum size of a WLAN media access control (MAC) service data unit (SDU);
   generating a WLAN PDU comprising the LTE PDU; and
   transmitting the WLAN PDU to an access point via a WLAN physical layer.

2. The communication device of claim 1, wherein the LTE PDU comprises a LTE packet data convergence protocol (PDCP) PDU or a LTE radio link control (RLC) PDU.

3. The communication device of claim 1, wherein the WLAN PDU and the WLAN physical layer conform to at least one Institute of Electrical and Electronics Engineers (IEEE) 802.11 standard.

4. The communication device of claim 1, wherein the WLAN PDU comprises a Subnetwork Access Protocol (SNAP) header which comprises an Ethernet type for the LTE PDU.

5. The communication device of claim 1, wherein the LTE PDU does not comprise any control element.

6. A communication device for aggregating a wireless local area network (WLAN) and a long term evolution (LTE) system, the communication device comprising:
   a storage device; and
   a processing circuit, coupled to the storage device, wherein the storage device stores, and the processing circuit is configured to execute instructions of:
   generating a LTE protocol data unit (PDU), wherein a size of the LTE PDU is not larger than a maximum size of a WLAN media access control (MAC) service data unit (SDU); and
   transmitting the LTE PDU to an access point, for the access point to generate a WLAN MAC PDU comprising the LTE PDU.

7. The communication device of claim 6, wherein the LTE PDU comprises a LTE packet data convergence protocol (PDCP) PDU or a LTE radio link control (RLC) PDU.

8. The communication device of claim 6, wherein the WLAN MAC PDU and the WLAN physical layer conform to at least one Institute of Electrical and Electronics Engineers (IEEE) 802.11 standard.

9. The communication device of claim 6, wherein the WLAN MAC PDU comprises a Subnetwork Access Protocol (SNAP) header which comprises an Ethernet type for the LTE PDU.

10. The communication device of claim 6, wherein the LTE PDU does not comprise any control element.

* * * * *